(12) United States Patent
Fischer

(10) Patent No.: US 6,454,297 B2
(45) Date of Patent: Sep. 24, 2002

(54) VEHICLE OCCUPANT RESTRAINT SYSTEM

(75) Inventor: Anton Fischer, Leinweiler (DE)

(73) Assignee: TRW Occupant Restraint Systems GmbH & Co. KG, Aldorf (DE)

( * ) Notice: Subject to any disclaimer, the term of this patent is extended or adjusted under 35 U.S.C. 154(b) by 0 days.

(21) Appl. No.: 09/772,836

(22) Filed: Jan. 30, 2001

(30) Foreign Application Priority Data

Feb. 4, 2000 (DE) .......................................... 200 01 960

(51) Int. Cl.$^7$ .............................................. B60R 21/22
(52) U.S. Cl. ................................ 280/730.2; 280/743.2
(58) Field of Search .......................... 280/730.2, 749, 280/743.2, 753

(56) References Cited

U.S. PATENT DOCUMENTS

| | | | | |
|---|---|---|---|---|
| 5,226,672 A | * | 7/1993 | Husted ........................ | 280/749 |
| 5,462,308 A | * | 10/1995 | Seki et al. ................... | 280/749 |
| 5,788,270 A | * | 8/1998 | Haland et al. ........... | 280/730.2 |
| 5,924,722 A | * | 7/1999 | Koide et al. ............. | 280/730.2 |
| 6,029,993 A | * | 2/2000 | Mueller .................... | 280/730.2 |
| 6,168,194 B1 | * | 1/2001 | Cuevas et al. ........... | 280/730.2 |
| 6,186,536 B1 | * | 2/2001 | Fischer ..................... | 280/730.2 |

FOREIGN PATENT DOCUMENTS

| | | | |
|---|---|---|---|
| DE | 19719926 | | 11/1998 |
| DE | 19726782 | | 5/2000 |
| JP | 409277898 A | * | 10/1997 |
| JP | 11-124002 A | * | 5/1999 |

* cited by examiner

*Primary Examiner*—Paul N. Dickson
*Assistant Examiner*—Ruth Ilan
(74) *Attorney, Agent, or Firm*—Tarolli, Sundheim, Covell, Tummino & Szabo L.L.P.

(57) ABSTRACT

The invention relates to a vehicle occupant restraint system comprising an inflatable gas bag, a gas-carrying distributor pipe projecting into the gas bag and a piston housed displaceably in the distributor pipe. The restraint system further comprises a power transmission means which connects the piston and the gas bag with each other and via which a force for tensioning the gas bag is transferred onto said gas bag. A deflection member for the power transmission means is provided in the distributor pipe. The power transmission means is constructed as a traction means.

11 Claims, 2 Drawing Sheets

VEHICLE OCCUPANT RESTRAINT SYSTEM

TECHNICAL FIELD

The invention relates to a vehicle occupant restraint system.

BACKGROUND OF THE INVENTION

An occupant restraint system known from DE 298 06 200 comprises a piston housed in the distributor pipe, which piston is displaced by the gas generator which also serves for inflating the gas bag. A rod mounted to the piston projects out from the distributor pipe and in the case of restraint is pressed out from the distributor pipe still further, whereby a gas bag, which is fastened t o the rod, is tensioned.

BRIEF SUMMARY OF THE INVENTION

The invention provides a vehicle occupant restraint system in which a rod, stressed with regard to thrust and bending, can be avoided as power transmission means. This is achieved in a vehicle occupant restraint system which comprises an inflatable gas bag, a gas-carrying distributor pipe projecting into the gas bag and a piston housed displaceably in the distributor pipe. The restraint system further comprises a power transmission means which connects the piston and the gas bag with each other, which is constructed as a traction means, and via which a force for tensioning the gas bag is transferred onto the latter. Further, a deflection member for the power transmission means is provided in the distributor pipe. Through the provision of an integrated deflection member, it is possible to use a flexible traction means and to draw it by means of the expanding gas further into the distributor pipe, although the moving piston moves outwards. In the process, advantageously a tensioning cable can be used as traction means.

The deflection member deflects the traction means through approximately 180° and advantageously extends through an opening in the piston in which it is displaceable. The traction means leaves the distributor pipe preferably at one of its ends, so that no additional openings which are to be sealed have to be provided in the distributor pipe.

So that the traction means is positioned exactly in the distributor pipe and also remains there during the tensioning process, one or more traction means guides can be provided in the distributor pipe, which can be formed for example in one piece on the distributor pipe.

Preferably, a deflection sheave comes to be used as deflection member, so that as few friction losses occur as possible.

According to the preferred embodiment, the occupant restraint system is a side occupant restraint system with a head-side gas bag having a large area, which serves for the at least partial covering of a side window of a vehicle. The distributor pipe extends along the roof frame of the vehicle.

In the region of a vehicle column, according to the preferred embodiment a further deflection member is provided for the traction means, from which deflection member the traction means extends to the gas bag. The gas bag is tensioned between fastening points, preferably at its opposite ends, at least one of the fastening points being formed by the traction means.

By the invention it is possible to hold the head gas bag, which has a large area, tensioned over several seconds, for example during an overturn of the vehicle, if a portion of the gas has already escaped from the gas bag.

DETAILED DESCRIPTION OF THE PREFERRED EMBODIMENT

Figure 1:
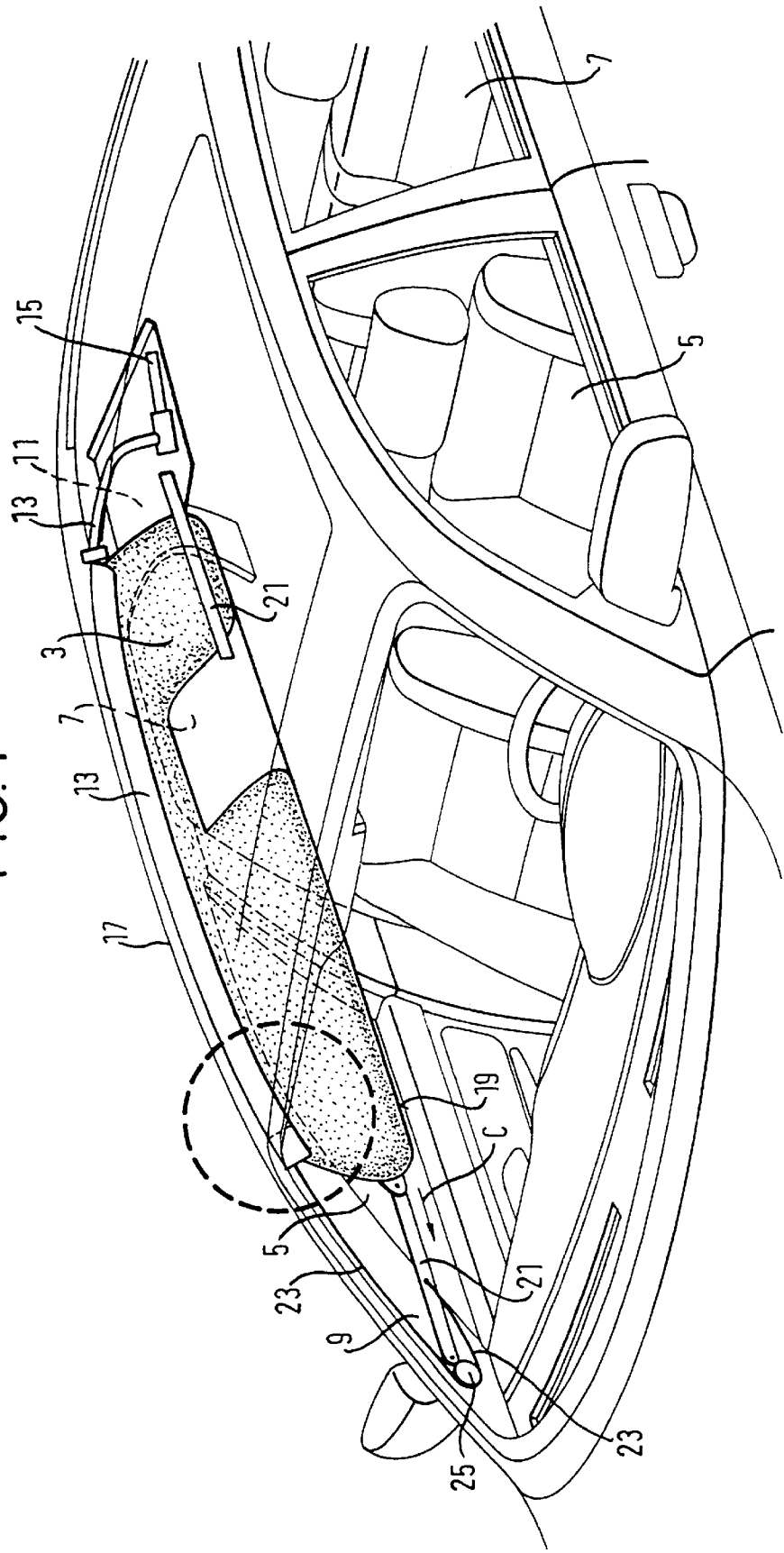
FIG. 1 shows a perspective view of an embodiment of the vehicle occupant restraint system according to the invention, with the gas bag unfolded.

In FIG. 1 a side vehicle occupant restraint system is illustrated, which has an inflated head gas bag 3 having a large area, which covers the side windows 5, 7 of a vehicle to a large part and extends from the A-column 9 to the C-column 11 of the vehicle. The restraint system has in addition a distributor pipe 13 and also a gas generator 15 which is arranged in the region of the C-column. The distributor pipe extends from the gas generator 15 into the interior of the gas bag 3 and along the roof frame 17 of the vehicle up to the A column 9, where it ends. The gas bag 3 has so-called tensioning bands 21 in the region of its opposite ends and in the region of its lower edge 19, which serve for anchoring the gas bag in the vehicle and which belong to the gas bag 3. The outer ends of the tensioning bands 21 are fastening points of the gas bag 3.

Figure 2:
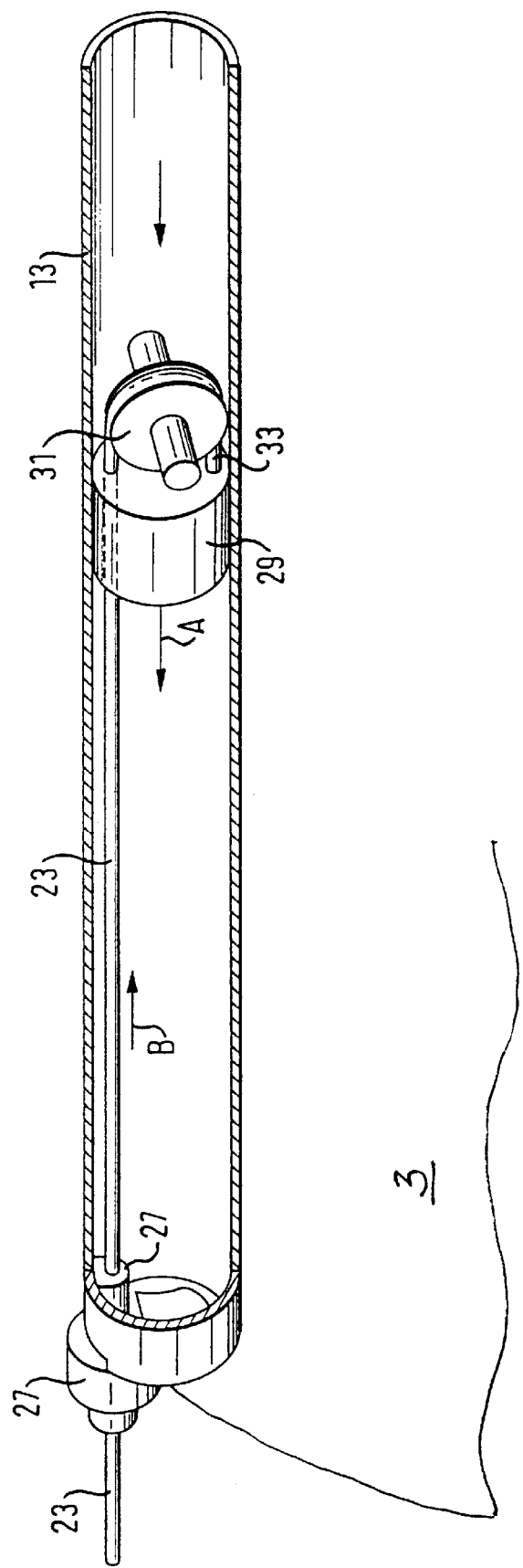
FIG. 2 shows a perspective sectional view through the end of the distributor pipe, framed with broken lines in FIG. 1.

The rear tensioning band 21 is fastened by its rear free end to the C-column 11. On the front tensioning band 21 a traction means in the form of a traction cable 23 is fastened, which extends horizontally up to a first deflection sheave 25 as deflection member. The first deflection sheave 25 is arranged in the lower region of the A-column. From the deflection sheave 25, the traction cable 23 runs along the A-column 9 upwards and at the front, open end of the distributor pipe 13 on the end face into this pipe 13, as FIG. 2 shows. Only a section of gas bag 3 is illustrated in FIG. 2.

In the region of the open end of the distributor pipe 13, a traction means guide 27 is provided in the form of a pin formed in one piece on the distributor pipe 13 and having a passage opening for the traction cable 23. The traction cable 23 extends deeper into the interior of the distributor pipe 13 and through a passage opening in a piston 29, displaceably mounted in the distributor pipe 13, up to a rotatably mounted second deflection sheave 31 arranged stationary in the distributor pipe, which sheave 31 forms a deflection member for the traction cable 23. Through the deflection sheave 31, the traction cable is deflected through 1800. The deflected end 33 of the traction cable is then fastened to the piston.

In the case of restraint, the gas generator 15 generates gas which flows into the distributor pipe 13 and from there via openings in the distributor pipe 13 into the gas bag. A portion of the gas arrives up to the piston 29 and displaces the latter according to FIG. 2 to the left in the direction of arrow A. The traction cable 23 is thereby drawn from the deflection sheave 31 in the direction of arrow B and the tensioning band 21 is drawn in the direction of arrow C in FIG. 1 and tensioned. Thereby, the gas bag 3 is tensioned in the region of its lower edge 19 between its fastening points. It remains stable over several seconds and can thereby also still develop a sufficient protective effect in the case of an overturn of the vehicle.

What is claimed is:

1. A vehicle occupant restraint system comprising:
   an inflatable gas bag;
   a gas carrying distributor pipe extending into an interior of said gas bag;
   a piston housed displaceably in said distributor pipe;
   a flexible traction means which connects said piston and said gas bag with each other and via which a force for tensioning said gas bag is transferred onto said gas bag; and
   a deflection member for said traction means arranged stationary and completely in the interior of said distributor pipe, said traction means at least in the region of said deflection member being arranged completely in an interior of said distributor pipe, said traction means travelling along said deflection member on displacement of said piston.

2. The vehicle occupant restraint system according to claim 1, wherein said deflection member deflects said traction means through approximately 180°.

3. The vehicle occupant restraint system according to claim 1, wherein at least one gas generator is provided which is connected with an interior of said distributor pipe such that it inflates said gas bag and leads to a displacement of said piston.

4. The vehicle occupant restraint system according to claim 1, wherein at least one traction means guide is provided on said distributor pipe.

5. The vehicle occupant restraint system according to claim 4, wherein said traction means guide is formed in one piece with said distributor pipe.

6. The vehicle occupant restraint system according to claim 1, wherein said deflection member is a deflection sheave.

7. The vehicle occupant restraint system according to claim 1, wherein said system is a side restraint system comprising a head gas bag having a large area and partially covering at least one side window of a vehicle, and wherein said distributor pipe extends along a roof frame of said vehicle.

8. A vehicle occupant restraint system comprising:

an inflatable gas bag;

a gas carrying distributor pipe extending into an interior of said gas bag;

a piston provided with an opening housed displaceably in said distributor pipe;

at least one gas generator which is flowingly connected with an interior of said distributor pipe to inflate said gas bag and to displace said piston;

a flexible traction means which connects said piston and said gas bag with each other and via which a force for tensioning said gas bag is transferred onto said gas bag;

a deflection member for said traction means arranged within said distributor pipe;

said traction means extending through and being displaceable within said opening in said piston and being drawn through said opening during displacement of said piston.

9. The vehicle occupant restraint system according to claim 8, wherein said traction means has one end affixed to said piston and extends within said distributor pipe firstly to said deflection means and secondly from said deflection means back to said piston and finally through said opening of said piston to an open end of said distributor pipe.

10. A vehicle occupant side restraint system comprising:

an inflatable head gas bag having a large area and partially covering at least one side window of a vehicle;

a gas carrying distributor pipe extending along a roof frame of said vehicle and extending into an interior of said gas bag;

a piston housed displaceably in said distributor pipe;

a traction means which connects said piston and said gas bag with each other and via which a force for tensioning said gas bag is transferred onto said gas bag;

a deflection member for said traction means completely arranged within said distributor pipe; and another deflection member provided for said traction means in a region of a vehicle column, from which said another deflection member said traction means extends to said gas bag.

11. The vehicle occupant restraint system according to claim 10, wherein said gas bag extends between two vehicle columns and said traction means tensions said gas bag between said two vehicle columns when unfolded between two fastening points provided at opposite ends of said gas bag.

* * * * *